United States Patent [19]

Broussoux et al.

[11] Patent Number: 5,172,024
[45] Date of Patent: Dec. 15, 1992

[54] DEVICE FOR THE REMOVAL OF THE ICE FORMED ON THE SURFACE OF A WALL, NOTABLY AN OPTICAL OR RADIO-ELECTRICAL WINDOW

[75] Inventors: Dominique Broussoux, Marcoussis; Michel C. Ceccaldi, Verrieres le Buisson; Pierre Leclerc, Voisins-le-Bretonneux, all of France

[73] Assignee: Thomson-CSF, Puteaux, France

[21] Appl. No.: 769,721

[22] Filed: Oct. 2, 1991

[30] Foreign Application Priority Data

Oct. 2, 1990 [FR] France ................. 90 12128

[51] Int. Cl.$^5$ .................................... H01L 41/08
[52] U.S. Cl. ..................... 310/323; 310/334; 310/800; 310/321; 310/322
[58] Field of Search ............ 310/800, 366, 363, 334, 310/321, 322, 323, 311, 328

[56] References Cited

U.S. PATENT DOCUMENTS

| | | | |
|---|---|---|---|
| 3,816,774 | 6/1974 | Ohnuki et al. | 310/800 X |
| 4,028,566 | 6/1977 | Franssen | 310/330 |
| 4,283,461 | 8/1981 | Wooden | 310/800 X |
| 4,363,991 | 12/1982 | Edelman | 310/338 |
| 4,427,609 | 1/1984 | Broussoux | 264/22 |
| 4,500,377 | 2/1985 | Brousseux | 156/164 |
| 4,521,322 | 6/1985 | Broussoux | 252/62.9 |
| 4,670,074 | 6/1987 | Broussoux | 156/198 |
| 4,732,351 | 3/1988 | Bird . | |
| 4,768,256 | 9/1988 | Motoda | 310/323 |
| 4,820,952 | 4/1989 | Lee | 310/334 |
| 4,849,668 | 7/1989 | Crawley | 310/326 X |
| 5,025,187 | 6/1991 | Fujie et al. | 310/323 |

FOREIGN PATENT DOCUMENTS

| | | | |
|---|---|---|---|
| 167740 | 2/1986 | European Pat. Off. . | |
| 0260173 | 3/1988 | European Pat. Off. | 310/800 |
| 358390 | 4/1990 | European Pat. Off. . | |
| 0043899 | 4/1981 | Japan | 310/800 |
| 2106966 | 1/1982 | United Kingdom . | |

Primary Examiner—Mark O. Budd
Attorney, Agent, or Firm—Pollock, VandeSande & Priddy

[57] ABSTRACT

A device to eliminate ice formed on the surface of a wall, notably on the surface of an optical or radio-electric window, comprises a piezoelectric material having a vibrating active surface that mechanically cooperates with the wall to be de-iced, and means for the polarization of this piezoelectric material, comprising an AC voltage source and conducting or semiconducting electrodes placed in contact with this material according to a geometry capable of generating, within this material, an acoustic wave that has a direction of vibration which is oriented longitudinally and/or transversally to said surface to be de-iced, the amplitude of this vibration being sufficient to respectively detach and/or break the deposit of ice formed on said surface. The piezoelectric material is preferably a ferroelectric polymer such as a polymer of the group comprising $PVF_2$, $PVF_2$-TrFE, PVDCN-VAc, $PVF_2$-TFE and the mixture of these polymers with one another and/or with PMMA or PEMA. The electrodes are preferably formed into a thin layer deposited on the surface of the piezoelectric material, and their material is then advantageously a material of the group comprising resistive indium-tin oxide, the polymers that are conductive in a matrix, hydrogenated amorphous silicon and polyimides charged with organic salts.

10 Claims, 2 Drawing Sheets

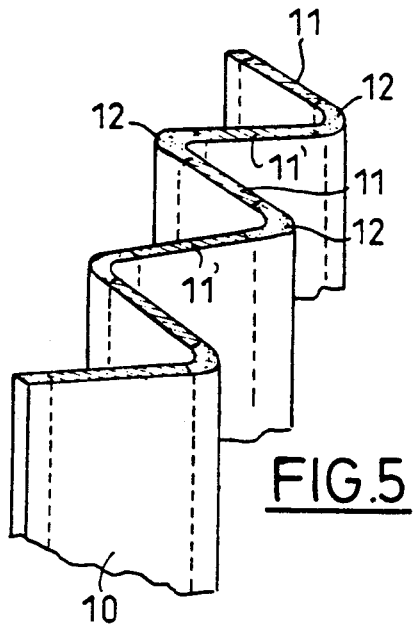
FIG.5
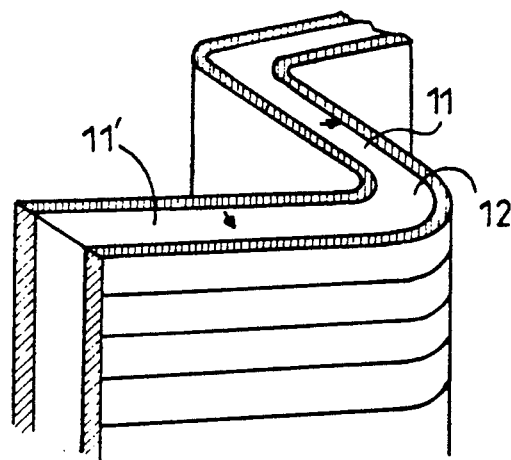
FIG.6
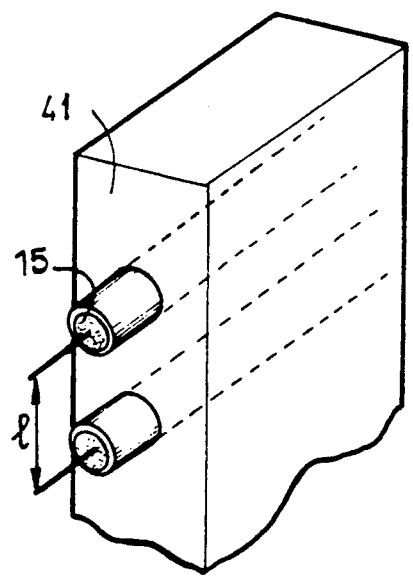
FIG.8
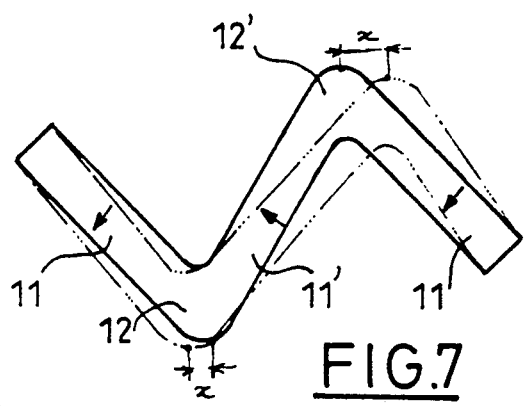
FIG.7
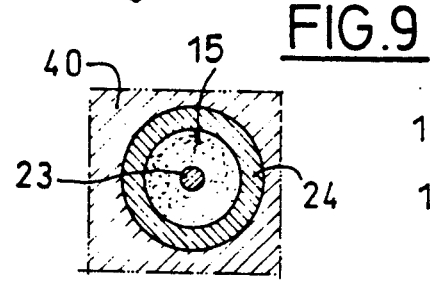
FIG.9
FIG.10
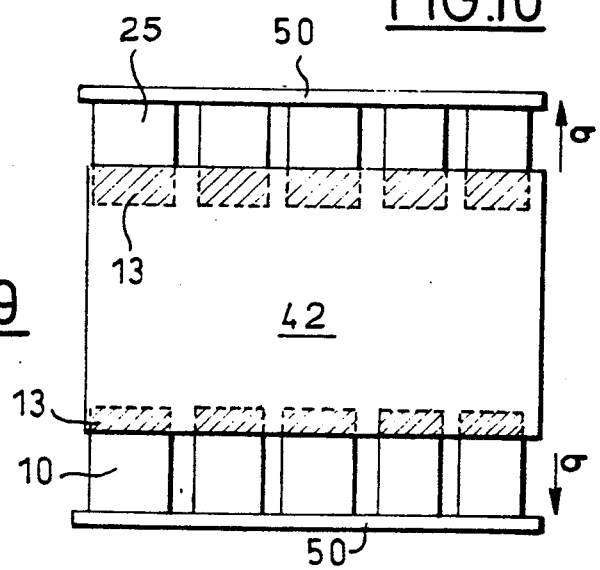

DEVICE FOR THE REMOVAL OF THE ICE FORMED ON THE SURFACE OF A WALL, NOTABLY AN OPTICAL OR RADIO-ELECTRICAL WINDOW

BACKGROUND OF THE INVENTION

1. Field of the Invention

The present invention relates to a device to eliminate the ice formed on the surface of a wall.

The present invention shall be described chiefly with respect to an application to the de-icing of an optical or radio-electrical window, for example the window of a radome. However, it will easily be understood that an application such as this is in no way restrictive and that a great many applications to the de-icing of other types of walls, especially in aeronautics, may be considered without going beyond the scope of the invention.

2. Description of the Prior Art

Essentially, when a deposit of ice formed on a surface has to be removed, the most common method used (apart from methods using compounds based on hydrophobic agents) consists in blowing hot air on to the wall to be de-iced, or in heating this wall by the Joule effect through metal wires deposited on the surface of this wall or embedded within it.

The major drawback of a system such as this lies in the fact that the heating wire actually heats only the part closest to it for, in almost every case, the material of the wall has low thermal conductivity as is typically the case with windows made of glass, whether mineral or organic.

This drawback is accentuated by the unfavorable ratio generally existing between the diameter of the wire and the spacing between two consecutive wires, whereas this ratio should be as small as possible when the wall is a window, in order to minimize the disturbances that might be introduced by the heating system.

Another drawback lies in the large amount of heat lost through conduction and radiation on the front and rear faces of the wall that is to be de-iced. This factor makes it necessary to have additional electrical power to compensate for the losses.

Furthermore, the heating is not instantaneous and, if it is to be properly efficient, the time that it requires to reach thermal equilibrium must become greater as and when the temperature is further away from the melting temperature of ice.

Furthermore, should the wall be a radio-electric window such as a radome window, a number of constraints come into play, notably the fact that, so as not to disturb the wave transmitted by the radome-shielded radar, the metal wires should be, firstly, deposited perpendicularly to the polarization of the wave transmitted (which limits the choice of the polarization). Secondly, the wires should be spaced out with respect to one another by a distance $\wedge$ determined by a relationship known to those skilled in the art (Proceedings of the IRE, Vol 49, 1961, pp. 427–447). This distance would be of the order of 8 mm approximately for a radar working at 4 GHz through a window.

This latter constraint thus necessitates the matching of the de-icing system with the working frequency of the radar covered by the radome, thus severely restricting the possibilities of choice of the characteristics of this radome.

Finally, to ensure maximum reliability, especially in the case of a radar, it would be necessary to provide for a standby energy source for the de-icing system. Given the substantial power needed for de-icing (it is estimated that, for a 4 $m^2$ window corresponding to the surface of a radar radome on the ground transmitting at 4 GHz, it is necessary to provide about 2 to 3 kW per $m^2$, that is 8 to 12 kW for the window), this results in installations in which cost and overall dimensions become prohibitive.

One of the aims of the invention is to propose a device that overcomes all of these drawbacks by means of a system using no longer the Joule effect but the mechanical vibrations produced by acoustic transmitters, notably acoustic transmitters based on ferroelectric polymers, deposited at the location of the window of the radome.

The major promising feature of this technique lies in the fact that the effect is mechanical and, therefore, does not necessitate any heating time or any permanent operation (intermittent operation will suffice): this is a considerable advantage in terms of energy consumption.

Besides, it will be seen that the invention enables the making of walls, the entire surface of which is active (and no longer walls that are active only locally, as in the case of heating wires), the consequence of which will be to considerably increase the efficiency of conversion of electrical power into acoustic power and, hence, the ultimate efficiency of the system.

It will also be seen that the invention can be used to make a radio-electric window that is transparent to microwaves, irrespectively of the transmission frequency of the radar, hence a window which, by virtue of this quality, does not require any special matching for a given frequency, unlike prior art de-icing systems using heating wires.

Finally, it will be seen that the invention can be adapted to plane walls as well as to walls of different shapes, for example corrugated walls or alternately corrugated and plane walls, according to a structure that enables the further amplification of the mechanical deformation produced by the acoustic wave, and hence the efficiency of the system.

SUMMARY OF THE INVENTION

To this effect, more precisely, the device of the invention comprises:

a piezoelectric material having a vibrating active surface that mechanically cooperates with the wall to be de-iced, and means for the polarization of this piezoelectric material, comprising an AC voltage source and conducting or semiconducting electrodes placed in contact with this material according to a geometry capable of generating, within this material, an acoustic wave that has a direction of vibration which is oriented longitudinally and/or transversally to said surface to be de-iced, the amplitude of this vibration being sufficient to respectively detach and/or break the deposit of ice formed on said surface.

Very advantageously, the piezoelectric material is a ferroelectric polymer, notably a polymer of the group comprising $PVF_2$, $PVF_2$-TrFE, PVDCN-VAc, $PVF_2$-TFE and the mixture of these polymers with one another and/or with PMMA or PEMA.

Very advantageously again, said electrodes may be formed into a thin layer deposited on the surface of the piezoelectric material, the material of these electrodes and the thickness of the layer being then chosen so that the electrodes, firstly, have a conductivity capable of providing for the transfer, to the piezoelectric material, of the electrical excitation voltage and, secondly, are essentially transparent to the wavelengths of the optical or radio-electric radiation that has to cross the window.

In this case, the material of the electrodes is then preferably a material of the group comprising resistive indium-tin oxide, the polymers that are conductive in a matrix, hydrogenated amorphous silicon and polyimides charged with organic salts.

In a first embodiment, the piezoelectric material is self-supported and forms said wall to be de-iced.

In a second embodiment, it is formed into a film attached to another material forming the body of said wall to be de-iced.

In a third embodiment, the wall is a corrugated wall comprising an alternation of zones with high curvature and zones with low curvature, the polarization being applied to the low curvature zones of this wall. The successive zones receiving a polarization then preferably receive polarizations with opposite respective directions, and the mechanical rigidity of the low curvature zones of the wall is greater than that of the high curvature zones.

In a fourth embodiment, the piezoelectric material is formed into an elongated wire provided with its own coaxial electrodes, a plurality of these wires being buried in a matrix of a material forming the body of said wall.

In a fifth embodiment, the piezoelectric material is formed into a plurality of elements interposed between a peripheral shoulder of said wall and an assembly support frame of this wall.

In every embodiment, the AC voltage source may be modulated so as to produce an intermittent transmission and it is further possible to provide the surface of said wall to be de-iced with a layer of hydrophobic material reducing the wettability of water at this place.

BRIEF DESCRIPTION OF THE DRAWINGS

Embodiments of the invention shall now be described with reference to the appended drawings.

In all of these figures, the same numerical references designate functionally similar elements.

FIG. 5 illustrates a third embodiment, using a corrugated wall that enables the amplification of the deformations produced by the acoustic transmissions.

FIG. 6 shows a detailed view of one of the curved regions of the wall of FIG. 5.

FIG. 7 shows a plane view, corresponding to FIG. 6, showing the amplitude and the direction of the different deformations produced within the wall.

FIG. 8 illustrates a fourth embodiment, in which the plane active surface is replaced by cylindrical surfaces corresponding to piezoelectrical wires molded in a matrix constituting the wall.

FIG. 9 shows a sectional view of the detail of one of the piezoelectrical wires of FIG. 8.

FIG. 10 illustrates a fifth embodiment, in which the piezoelectric elements are used as elements for the excitation of a membrane made of flexible material.

DETAILED DESCRIPTION OF THE PREFERRED EMBODIMENT

The invention essentially consists of the use of the mechanical vibrations obtained by the excitation, using AC voltages, of acoustic transmitters based on ferroelectric polymer films such as polyvinylidene fluoride or $PVF_2$, poly(vinylidene fluoride$_x$-trifluoroethylene$_{1-x}$) or $PVF_2$-TrFE, poly(vinylidene cyanide$_{50}$-vinyl acetate$_{50}$) or PVDCN-VAc, poly(vinylidene fluoride$_x$-tetrafluoroethyline$_{1-x}$) or $PVF_2$-TFE or the mixtures of these polymers with poly(methyl) methacrylate or with poly(ethyl) methacrylate (PMMA or PEMA) or else, again, mixtures of these polymers with one another.

Figure 1:
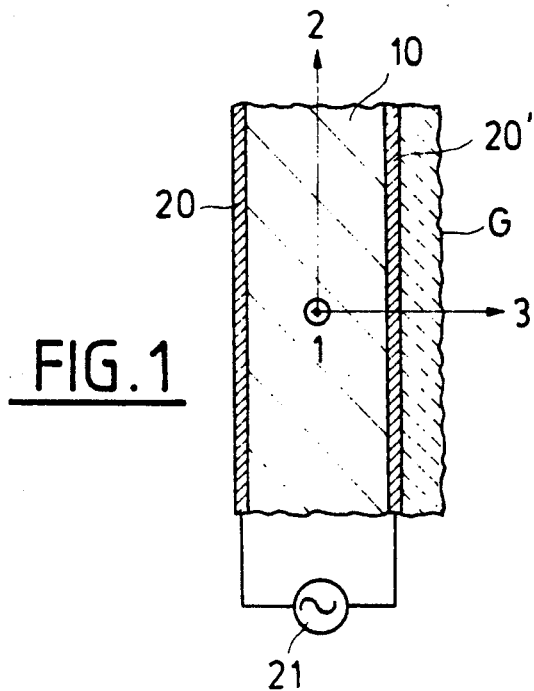
FIG. 1 shows a schematic sectional view illustrating the principle of implementation of the invention.

The structure may be be, for example, the one shown in FIG. 1, where the window 10 is constituted by the ferroelectric material itself, on the surface of which electrodes 20, 20' have been deposited on either side, enabling an appropriate polarization to be applied to this material under the effect of an AC voltage at the natural resonance frequency, produced by a source 21, so as to stress the material and break the ice film G formed on its surface.

Figure 2:
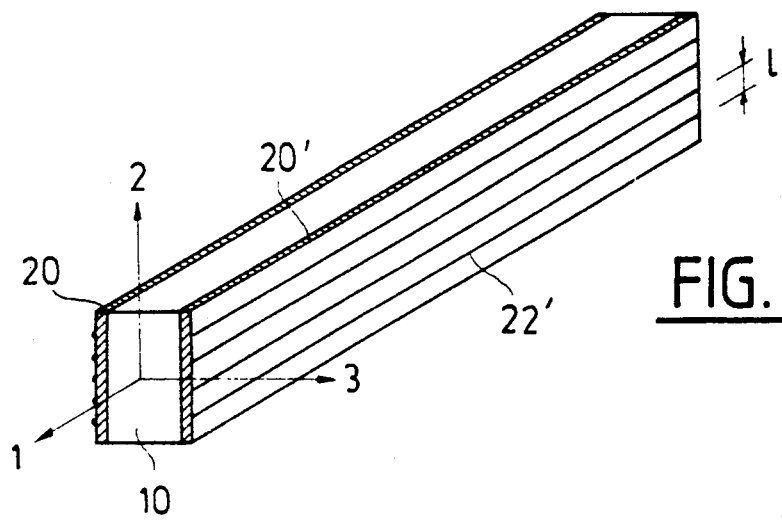
FIG. 2 shows a view in perspective of a first embodiment of the invention.

In their non-centrosymmetrical polar structure obtained after electrical polarization, the ferroelectric polymer films envisaged herein exhibit piezoelectric properties and, consequently, the application of a voltage to the electrodes deposited on their faces generates a shift $\Delta X_i/X_i$ (with i=1, 2 or 3, these indices corresponding respectively to the directions in the plane (i=1, 2) and along the thickness (i=3) shown in FIGS. 1 and 2, such that:

$$\Delta X_i/X_i = d_{3i}E_3,$$

$E_3$ being the electrical field in the perpendicular direction associated with the voltage V applied to the film and $d_{3i}$ being the piezoelectric coefficient in the direction of shift i.

In general, the mode of vibration in the direction i is defined by its resonance frequency:

$$f_r^i = (\tfrac{1}{2}L)[C^P_{ii}/\rho]^{\tfrac{1}{2}},$$

$C^P_{ii}$ being the elastic constant of the polymer (of the order of $5.10^9$ N/m$^2$) in the direction i, $\rho$ being the density of the polymer (of the order of 1.7 g/cm$^3$) and L being a dimension that may be the thickness (1 mm) or the length (1 to 2 m).

With the numerical values given by the above example, which are appropriate to the implementation of the invention, in transversal mode a band with a length of 1 m will vibrate around 200 Hz, and in horizontal mode a band with a length of 1 m will vibrate around $10^6$ Hz.

The longitudinal shift (direction ii=33) or transversal shift (direction ii=11) generated by the application of an electrical field, in the direction i=3, of $10^7$ V/m (giving 10000 V or a thickness of one mm) will be:
ti $\Delta X_i/X_i = d_{3i}$ Thus, for $$d_{31} = 20.10^{-12} \, m/V,$$

there will be a relative shift of $$\Delta X_1/X_1 = 2.10^{-4},$$

and for
$$d_{33} = 30.10^{-12} \, m/V,$$

there will be a relative shift of $$\Delta X_3/X_3 = 3.10^{-4}.$$

If the film is rigidly covered on the surface by a film of ice with an isotropic elastic constant $$C^g > 5.10^{12} \, N/m^2$$

the strain $\sigma_{11}$ generated in the film of ice along the direction $i=1$ will be, according to Hooke's law, $\sigma_{11} C^g \Delta X_1/X_1 > 10^9 \, N/m^2$ in the ice, giving a force of 2000N on a film of ice with a thickness of 10 µm and a width of 20 cm, thus breaking this film of ice.

To apply this strain at the resonance frequency, the electrical power needed is:

$$P_{electric} = P_{drawn} + P_{elastic}/k_{31}$$

the power drawn being negligible at these frequencies and $k_{31}$, the coefficient of electromagnetic coupling, being equal to 0.2, (with $k_{33} = 0.3$)
The elastic energy is then:

$$W = \tfrac{1}{2} V C^P_{11} (\Delta X_1 X_1)^2 \sim 5.10^{-3} \, J.$$

With the values: $V = I.L.e = 0.2 \times 1 \times 10^{-3} = 2.10^{-4} \, m^3$, $C^P_{11} = 1.10^9 \, N/m^2$ and $\Delta X_1/X_1 = 10^{-4}$,
we get $$P_{electric} = W\omega/k^2_{31} \sim 200 \, W$$

with
$f = 250$ Hz and $\omega = 2\pi f$.
i.e. when represented as a function of the area, a relative electrical power value of about 1 kW/m².

With this type of excitation in transversal mode, the film of ice under formation breaks.

If an excitation in thickness mode is applied simultaneously, the fragments of the film of ice thus broken could then get detached from the wall.

The electrical power in longitudinal mode corresponding to this second mode of excitation is expressed in the form:

$$P_{electric} = P_{drawn} + P_{acoustic} + P_{reflected}$$

Indeed, at high frequency, the surfaces' areas that vibrate are large because the shift takes place along the perpendicular to the front and rear faces of the film and the impedances of the front and rear environments (air in the rear, ice or water in front) become high in regard to the phenomena of propagation (front face) and reflection (rear face). Furthermore, at frequencies of the order of $10^6$ to $10^7$ Hz, the drawn power is expressed in the form:

$$P_{drawn} = 107/2\epsilon_0\epsilon_r E^2 tg\delta.$$

With numerical values of $\epsilon_r = 5$, $E_0 = 10^7$ V/m, $tg\delta = 0.1$ and $\omega = 10^6$ rd/s, we obtain a value of energy drawn per second:

$$P_{drawn} \approx 10^8 \, W/M^3$$

giving a value of energy drawn per cycle $$Q_{drawn} = 10 \, J/M^3$$

This leads to a rise in temperature per cycle (the calorific capacity $C_v$ being of the order of $2.4.10^6 \, J/m^3.°K.$) of about:

$$\Delta T = Q_{drawn}/C_v \sim 10^{-5°} \, K.,$$

i.e. a value that is quite negligible.

This type of operation is based on electrical pulse trains with a frequency $f_0$ equal to the resonance frequency and modulated at the frequency $\Omega$ (typically 10 to 100 Hz), which considerably reduces the mean power of the system.

The total mean electrical power in longitudinal mode is then, for $\Omega = 100$ Hz and for a volume of $2.10^{-4} m^3$:

$$\overline{P}_{electric} = \overline{P}_{drawn} + \overline{P}_{elastic}/k^2_{33} + \overline{P}_{reflected}$$

with numerical values of:

$$\overline{P}_{drawn} = some \, watts$$

$$\overline{P}_{elastic}/k^2_{33} \approx 10W/0.1 \approx 30 \, W \text{ and}$$

$$\overline{P}_{reflected} \approx 0.5 \, (\overline{P}_{elastic} k_{33}) \approx 15 \, W,$$

we arrive at a power value $\overline{P}_{electric} = 50$ W approximately.

The total power per square meter of acoustic transmitter is then of the order of 250 W.

In short, the invention thus makes it possible:
first of all, to excite the plates under deformation along their length or their width (directions 1 and 2) and
secondly, to excite the plates under deformation along their thickness (direction 3).

Both modes may be applied simultaneously and may therefore increase the efficiency of the system.

Figure 3:
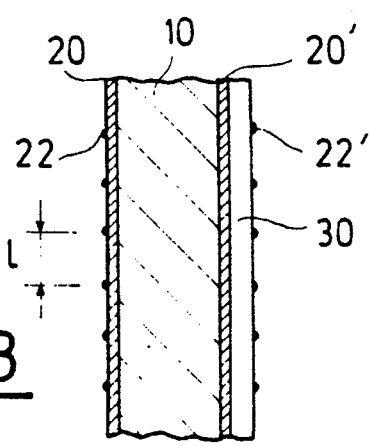
FIG. 3 shows a sectional view of the window corresponding to the embodiment of FIG. 2.

The structure may be, for example, the one illustrated in FIGS. 2 and 3, wherein the window 10 is constituted by a material which is itself ferroelectric, on the surface of which there are deposited, on either side, electrodes 20, 20' enabling the application of an appropriate polarization to this material under the effect of an AC voltage at the natural resonance frequency, produced by the source 21, so as to stress the material and break the film of ice G formed on the surface of this material.

The "ferroelectric polymers" used here are advantageously (not restrictively) polymers having the property of displaying a phase transition with the temperature (Curie temperature) and of also displaying a hysteresis cycle. These materials, which are known per se, have characteristics of piezoelectricity (used in the invention) as well as of pyroelectricity.

Since this piezoelectric material generally takes the form of a film, to make the window 10, which should have sufficient thickness, it is possible to juxtapose a plurality of films, for example with dimensions of $1 \times 0.2 \times 0.001 \, m^3$, that are currently available and are made according to techniques known to those skilled in the art.

The self-supported wall thus obtained is then covered on its front and rear faces with electrodes 20 and 20' which should be sufficiently conductive ($10^{-6}$ to $10^{-5} \Omega^{-1} cm^{-1}$) to transfer the electrical excitation voltage, but should be thin enough and should have conductivity that is low enough for them to be transparent, notably for them to be transparent to the microwaves in the case of a radome window.

For these electrodes, it is also possible to use materials such as resistive ITO (indium-tin oxide ), a conductive polymer (polypyrrole, polyaniline, polythiophene for example) in a matrix (of PMMA for example), hydrogenated amorphous silicon, or again a polyimide charged with organic salts such as tetracyanoquinodimethane (TCNQ) associated with tetrathiofulvalene (TTF).

The conductive layer can be either vapor deposited under vacuum by means of known standard methods for ITO and amorphous silicon or deposited by the bonding of a previously prepared polymer.

Besides, in order to apply the voltage to all the parts of the electrode, it is possible to provide for wires or thin conductive lines 22, 22' spaced out by ∧ (the wavelength in the dielectric) which may be small film strips of copper or aluminium, bonded or vapor deposited or, in the case of deposited semiconductor etched by laser graphitization which is a technique known to those skilled in the art.

As shown in FIG. 3, it is also possible to provide for the deposition of a thin layer 30 of hydrophobic material, i.e. a non-polar material, of a type that is known per se and is commercially available, to reduce the wettability of the water at the surface and thus increase the resistance of the system to adverse atmospheric effects.

Figure 4:
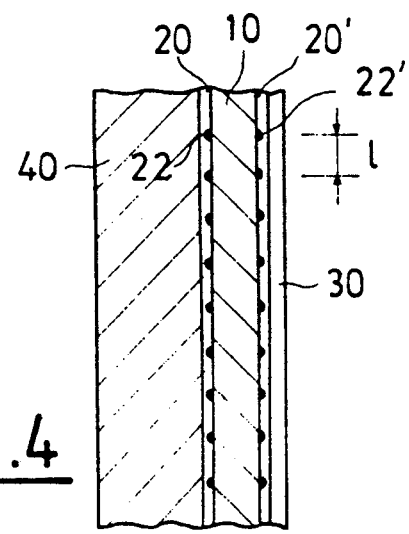
FIG. 4 shows a sectional view, similar to that of FIG. 3, of a second embodiment of the invention.

FIG. 4 shows a second embodiment in which the vibrating film window 10, provided with its semiconductor electrodes 20, 20' and their supply wires 22, 22', is no longer self-supported but bonded to a support 40 constituting the window proper, for example a support made of an organic material such as a polyethylene, a polyurethane or a polycarbonate.

FIGS. 5 to 7 illustrate a third embodiment in which it is sought to create a window structure that is no longer plane but corrugated, enabling the creation of regions with amplified deformation.

The piezoelectric window-forming material 10 is thus formed into a plurality of zones of low curvature 11, 11' joined to zones of high curvature 12, 12'.

The polarization electrodes are configured so that the zones with low curvature 11, 11' are polarized, while leaving the highly curved zones 12, 12' non-polarized.

Furthermore, the direction of the polarization will be alternated between a polarized zone 11 and the adjacent polarized zone 11'. This will have the effect of amplifying the deformation since, as can be seen in FIG. 7 for example, the positively polarized zone 11' will expand while the negatively polarized zone 11 will contract.

This effect may be further increased if the zones with low curvature are given a rigidity that is greater than that of the highly curved zones, i.e. if the zones 12, 12' are flexible and the zones 11, 11' are rigid.

This may be achieved with ferroelectric polymers of $PVF_2$, such as $PVF_2$-TrFE, which will be molded and pressed into the desired shape, with a high mechanical flexibility obtained by quenching at the molten stage.

Then, by polarizing the low curvature zones 11, 11', a substantial increase in crystallinity could be induced beneath an intense electrical field (greater than 1 MV/m), this crystallinity going from about 30–40% to 90%. This increase results in a notable diminishing of the flexibility, thus making it possible to obtain the desired structure with a heterogeneity of elasticity from one zone to the next one.

In a fourth embodiment, illustrated in FIGS. 8 and 9, the plane active surface of the preceding examples is replaced by cylindrical surfaces in the form of piezoelectric wires molded in a polymer matrix 40 constituting the window of the radome. Naturally, in an application to a radome window, the spacing 1 between each wire will be chosen as a function of the operating frequency of the radar.

The piezoelectric wires are constituted, as can be seen in FIG. 9, by a metal core 23 coated with the ferroelectric material 15, the entire piece being sheathed in a conductive material 24 constituting the active surface of the wire, capable of transmitting the vibrations of the material 15 to the mass 41 in which it is embedded.

In a fifth embodiment, shown in FIG. 10, the piezoelectric elements 25 act as elements for the excitation of a membrane 42, made of flexible material, constituting the wall to be de-iced.

This flexible material, which may be made of polyvinyl chloride, polyethylene, polycarbonate or another commercially available plastic material, may be excited in longitudinal vibration mode at frequencies ranging from 100 Hz to 20 kHz, depending on the dimensions of the piezoelectric elements 25 which work at their resonance frequency.

To this end, these elements 25 are placed on two opposite longitudinal sides of the membrane 42 and connected to a rigid supporting frame 50, the other end being connected to the membrane 42, for example by bonding at 13.

To amplify the deformation, the bonded zones may be made, if necessary, in a corrugated form (as in the embodiment of FIGS. 5 and 7), and it is also possible, for example, to positively excite the piezoelectric elements of the row located on one of the sides of the membrane and negatively excite those located on the other side, the purpose of this being to amplify the deformation of the membrane (the arrow referenced o indicates the direction and the orientation of the strain obtained in this case).

Finally, the various piezoelectric elements may be excited simultaneously, sequentially or in a random order and/or random number in order to obtain non-homogeneous deformations of the membrane, the de-icing efficiency of which will be further increased.

What is claimed is:

1. A device to eliminate ice formed on the surface of a wall of an optical or radio-electric window, comprising:

a self-supporting piezoelectric material forming at least a portion of said wall chosen from among the ferroelectric polymers of the group comprising $PVF_2$, $PVF_2$-TrFE, PVDCN-VAc, $PVF_2$-TFE and the mixture of these polymers with one another and/or with PMMA or PEMA, said piezoelectric material having a vibrating active surface that mechanically vibrates to eliminate ice on said wall, and means for polarizing said piezoelectric material, comprising an AC voltage source and electrodes made of a material of the group comprising resistive indium-tin oxide, polymers that are conductive in a matrix, hydrogenated amorphous silicon and polyimides charged with organic salts, the electrodes being in contact with said piezoelectric material according to a geometry for generating an acoustic wave having a direction of vibration which is oriented longitudinally and/or transversally to said surface to be de-iced, the amplitude of said vibration being sufficient to respectively detach and/or break the deposit of ice formed on said surface.

2. The device of claim 1, wherein said electrodes comprise a thin layer deposited on the surface of the piezoelectric material, the material of the electrodes and the thickness of the layer being chosen so that the electrodes have a conductivity capable of transferring to the piezoelectric material the electrical excitation voltage and are essentially transparent to the wavelengths of the optical or radio-electric radiation that traverses the window.

3. The device of claim 1, wherein said piezoelectric material comprises a film attached to another material forming the body of said wall to be de-iced.

4. The device of claim 1, wherein said wall is a corrugated wall comprising an alternation of zones with high curvature and zones with low curvature, the polarization is applied to the low curvature zones of the wall.

5. The device of claim 4, wherein the successive zones receiving a polarization receive polarizations with opposite respective directions.

6. The device of claim 4, wherein the mechanical rigidity of the low curvature zones of the wall is greater than that of the high curvature zones.

7. The device of claim 1, wherein the piezoelectric material is formed into an elongated wire provided with coaxial electrodes, a plurality of the wires being buried in a matrix of a material forming the body of said wall.

8. The device of claim 1, wherein the piezoelectric material is formed into a plurality of elements interposed between a peripheral shoulder of another portion of said wall and an assembly support frame for said wall.

9. The device of claim 1, wherein the AC voltage source is modulated so as to produce an intermittent voltage.

10. The device of claim 1 further comprising, a layer of hydrophobic material on said wall for reducing the wettability of water.

* * * * *